United States Patent [19]

Keehan

[11] Patent Number: 5,026,816

[45] Date of Patent: Jun. 25, 1991

[54] METALLIC OXIDE-OXIRANE POLYMERS AND PREPOLYMERS

[76] Inventor: Donald J. Keehan, 31012 Huntington Woods, Bay Village, Ohio 44140

[21] Appl. No.: 299,887

[22] Filed: Jan. 19, 1989

[51] Int. Cl.$^5$ .................. C08G 59/40; C08G 65/00
[52] U.S. Cl. ........................ 528/94; 528/106; 528/395; 525/523
[58] Field of Search ............... 528/94, 106, 395

[56] References Cited

U.S. PATENT DOCUMENTS

| | | | |
|---|---|---|---|
| 3,055,858 | 9/1962 | Frye | 528/19 |
| 3,264,235 | 8/1966 | Hustiny | 528/106 |
| 3,329,652 | 7/1967 | Christie | 528/94 |
| 3,394,105 | 7/1968 | Christie | 528/94 |
| 3,748,300 | 7/1973 | Lalancette | 528/106 |
| 3,929,716 | 12/1975 | Komoto et al. | 525/403 |
| 4,089,840 | 5/1978 | Blount | 528/94 |
| 4,277,596 | 7/1981 | Lalancette | 528/106 |
| 4,383,060 | 5/1983 | Dearlove et al. | 524/919 |
| 4,486,558 | 12/1984 | Guilbert | 528/100 |
| 4,499,217 | 2/1985 | Yoshimura et al. | 528/106 |

*Primary Examiner*—Earl Nielsen
*Assistant Examiner*—Frederick Krass
*Attorney, Agent, or Firm*—Fay, Sharpe, Beall, Fagan, Minnich & McKee

[57] ABSTRACT

The present invention relates to a novel oxirane prepolymer comprising the catalyzed reaction product of an inorganic oxide having at least one hydrolyzable oxygen with a difunctional oxirane oligomer having at least one aromatic moiety and at least one oxirane containing aliphatic moiety, characterized in that substantially all of the hydrolyzable oxygen atoms in said oxide are bonded to said oligomer and there is substantially no bonding between oligomer moieties.

The present invention also relates to a novel inorganic oxide containing polymer, said polymer comprising at least three crosslinked prepolymer moieties, each said prepolymer moiety being the reaction product of an inorganic oxide having at least one hydrolyzable oxygen with a difunctional oxirane oligomer having at least one aromatic moiety and at least one oxirane containing aliphatic moiety.

13 Claims, No Drawings

METALLIC OXIDE-OXIRANE POLYMERS AND PREPOLYMERS

BACKGROUND OF THE INVENTION

This invention relates to novel polymers and more particularly to high performance polymers provided by cross-reaction of an inorganic with an organic oligomer.

Oxirane oligomers are known to be very useful for meeting high performance needs in fabricating structural composites, protective coatings, adhesives, castings, laminating, electrical potting compounds and the like. The performance and utility of oxirane polymers are also known to be dependent upon their chemical structure, the curing agent used and conditions of cure. One important factor in achieving a high performance polymer is often the chemical structure of the polymer.

With proper formulation, polymer systems can be produced having enhanced properties in areas such as chemical and corrosion resistance, high adhesive strength, high heat deflection temperatures and toughness. These properties are often based on the crosslink density capabilities of the particular oligomer or prepolymer used. Usually, the higher the crosslink density, the higher the chemical and corrosion resistance, the higher the adhesive strength, the higher the mechanical strength, the higher the heat deflection temperature and the better the toughness.

One oxirane oligomer having a very low molecular weight and compact structure is diglycidyl ether of resorcinol (DGER), i.e.; 1,3-BIS-(2-3 epoxy propoxy) benzene, which has the following structure:

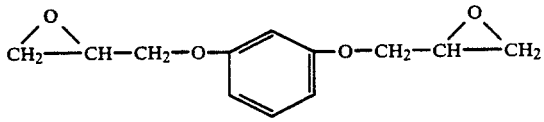

Diglycidyl ether of resorcinol has an epoxide equivalent of between 120 and 135 and a viscosity at 25° C. of between 300 and 500 CPS. The small molecular size leads to the low epoxide equivalent and indicates that the molecule can achieve a high final crosslink density.

Another oxirane olgomer is a low molecular weight diglycidyl ether of bisphenol A, having an epoxide equivalent between 172 and 176 and a viscosity at 25° C. between 4000 and 6000 CpS. This compound has the following structure:

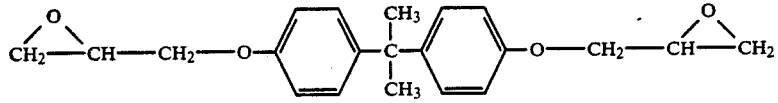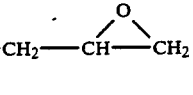

As already noted, both of these oxirane oligomers are known to be useful in preparing higher molecular weight crosslinked polymers. For example, U.S. Pat. No. 4,383,060 to Dearlove teaches an epoxy adhesive comprising an epoxy novolac resin, an epoxy flexibilizer, natural and colloidal silica and an imidazole curing agent. U.S. Pat. No. 4,499,217 to Yoshimura et al. is directed to a thermosettng resinous liquid compositions comprising a composite formed from a dispersion of silica colloid in alcohol and a thermosetting resin such as an epoxy-phenol. U.S. Pat. No. 4,486,558 to Gullbert discloses an electrically insulating powder comprising a blend of (1) a derivative of a polyglycidyl ether of bisphenol A and (2) finely divided silica, while U.S. Pat. No. 4,574,132 to Sayles describes an adhesive comprising (1) diglycidyl ether of bisphenol A, (2) diglycidyl ether of 1,4 butanediol, and (3) silica.

U.S. Pat. No. 3,748,300 to Lalancette is directed to a polyhydroxysilicate-polymer reaction product. The product is prepared by reacting a finely divided polyhydroxysilicate and a hydroxy-containing polymer. The Lalancette product, however, is obtained by reacting the polyhydroxysilicate and the hydroxy-containing polymer without the use of a coupling agent and the teaching stresses the elimination of the coupling agent. The resultant material is, in any case, a completely polymerized mass.

A great deal of work has been conducted with respect to the use of oxirane polymers, but little or no work has been done directed to chemically bonding an inorganic oxide to an organic oxirane polymer and, insofar as is known, none on the use of partial polymerization of the hydroxyl group of the inorganic and the oxirane group. This cross-linking of the inorganic oxide, with the organic oligomer, through partial polymerization can eliminate undesirable characteristics which result with mere physical blending and adds the beneficial properties of chemical bonding, while maintaining a prepolymer capable of being fully polymerized at a later date.

SUMMARY OF INVENTION

In one aspect, the present invention relates to a novel oxirane prepolymer comprising the catalyzed reaction product of an inorganic oxide having at least one hydrolyzable oxygen with a difunctional oxirane oligomer having at least one aromatic moiety and at least one oxirane containing aliphatic moiety, characterized in that substantially all of the hydrolyzable oxygen atoms in said oxide are bonded to said oligomer and there is substantially no bonding between oligomer moieties.

In another aspect, the present invention relates to a novel inorganic oxide containing polymer, said polymer comprising at least three crosslinked prepolymer moieties, each said prepolymer moiety being the reaction product of an inorganic oxide having at least one hydrolyzable oxygen with a difunctional oxirane oligomer having at least one aromatic moiety and at least one oxirane containing aliphatic moiety.

In still another aspect, the present invention relates to a process for preparing metallic oxide-oligomer prepolymers which comprise reacting a metallic oxide containing at least one hydrolyzable oxygen, with an oxirane oligomer having at least one aromatic moiety and at least one oxirane containing aliphatic moiety, in the presence of a quantity of catalyst sufficient to effect reaction of substantially all of the hydrolyzable oxygen atoms in the metallic oxide with the oligomer while effecting substantially no crosslinking of metallic oxide-oligomer moieties.

The novel polymers of the present invention are prepared by chemically bonding an inorganic oxide having a hydrolyzable oxygen, such as aluminum oxide, silica, magnesium oxide, or the like with a difunctional oxirane oligomer, such as the diglycidyl ether of resorcinol (DGER) or the diglycidyl ether of bisphenol A (DGEBA); causing only partial reaction of the oligomer with hydroxyl groups of the inorganic oxide, to form an organic-inorganic backbone, with the inorganic oxide grafted to the aromatic oxirane oligomer. These prepolymers can be further reacted and polymerized with tertiary, secondary or primary amines, anhydrides, Lewis acids, Lewis bases, amides, ureas, melamines, triazines and other commonly used hardeners and catalysts.

By forming the prepolymers, and reacting all the inorganic oxide functional groups with a portion of the oxirane groups, prior to final polymerization, it is possible to obtain enhanced properties in the final polymer such as heat deflection temperature, chemical resistance, toughness, tensile-flexural strengths, as compared to polymers formed by mere physical blending and direct polymerizing of the same oligomers, oxide filler, catalyst, hardener or initiator. The prepolymer is a liquid at or slightly above room temperature, with all hydrolyzable sites reacted irreversibly, eliminating further hydrolysis and chemical reaction. A further advantage when using DGER is that after cross linking with the inorganic oxide, the problem of dermatitis in handling is reduced or eliminated.

In order to react enough hydroxyl groups on the inorganic oxide to chemically bond them, and have hhe bound filler remain in solution when lowering the viscosity by heating or solvent addition, the surface area of oxide becomes extremely important. For example, silica has 3 to 6 silanol (SiOH hydroxyl) groups per 100 square angstroms. Therefore, 1 micron of surface area of silica has 300–600 hydroxyl groups. The inorganic oxides also have a critical particle size. Since they must have enough surface area, with exposed hydroxyl functional groups available for reaction, simply having a larger particle size, results in only a small portion of functional groups being available for reaction, the balance being in only a physical mixture. Because of its weight and gravitational force, when a mere physical mixture is heated up and the viscosity lowered, the large and heavy particles will separate and contribute to sedimentation.

The low viscosity of the prepolymers allows for sprayable coatings without having to use solvents, prepregging fibers, such as carbon, graphite, ceramic, glass, silicon carbide, etc., encapsulation of electronic equipment, reaction injection molding, filament winding and many other functions requiring or facilitated by low viscosity. These organic-inorganic prepolymers can be cured immediately, or at a future date, using any suitable oxirane (epoxy) catalyst or hardener. Such suitable epoxy catalyst and hardeners include primary and secondary amines, tertiary amines, anhydrides, imidazoles, amides, and the like.

Each prepolymer using a different metallic oxide delivers properties that are uniquely distinct from one another, e.g., fused silica gives low coefficient of thermal expansion, aluminum oxide gives abrasion resistance and flame retardancy, magnesium oxide gives high coefficient of thermal conductivity.

Physical evidence of formation of the organic-inorganic prepolymer is quite convincing. The product appears smooth and uniform and when dissolved in a solvent such as MEK or acetone, little or no separation or sedimentation takes place. Also, when the oligomer is heated to 93° C, its viscosity drops to 190 CPS, but little or no separation or sedimentation takes place even when spun in a centrifuge at 3300 RPM.

Chemical evidence of formation of the organic-inorganic prepolymer is seen in the improvement of its heat and chemical resistance of the subsequent polymer. 1000 grams of the prepolymer of Example 1 hereinafter were mixed with 144 grams of diaminodiphenyl sulfone (DADS) and cured 4 hrs. at 175° C plus 24 hrs. at 120° C. 1000 grams of diglycidyl ether of resorcinol (DGER) and 1000 grams of the diglycidyl ether of bisphenol A were separately mixed with an equivalent molar quantity of silica and 360 grams of diaminodiphenyl sulfone (DADS) and cured 4 hrs. at 175° C. plus 24 hrs. at 120° C. When cured with the diaminodiphenyl sulfone (DADS), the polymer prepared from the prepolymer of the present invention had a heat distortion temperature of 304° C. While heat distortion temperatures for the equivalent polymers from the diglycidyl ether of bisphenol A (DGEBA) was approximately 178° C. and for diglycidyl ether of resorcinol was approximately 148° C.

Since true prepolymers rather than admixtures are involved, it is appropriate to refer to the prepolymers as siloxirane prepolymers when silica is the inorganic oxide, aloxirane when alumina is the inorganic oxide, magoxirane when a magnesium oxide is the inorganic oxide.

In every test case when DGEBA or DGER were cured with primary and secondary amines, tertiary amines, anhydrides or other epoxy hardeners or catalysts, their chemical resistance was considerably lower than for equivalent polymers prepared from the prepolymer of the present invention using the same hardener or catalyst and cure temperature.

1000 grams of the prepolymer (DGEBA/Silica) were mixed with 190 grams of meta-phenylene diamine (MPDA) and cured 2 hrs. at 125° C. plus 2 hrs. at 175° C. 1000 grams of diglycidyl ether of bisphenol A (DGEBA) were also mixed with 190 grams of meta-phenylene diamine (MPDA) and cured 2 hrs. at 125° C. plus 2 hrs. at 175° C. Testing of these equivalent polymers prepared from admixture vs. a prepolymer produced the data set forth in the following Table.

TABLE

| CHEMICAL DATA: | | | TEST DATA STATUS: | | | |
|---|---|---|---|---|---|---|
| CHEMICAL | % | TEMP. | DISS.* | ATTACK.** | UNAFF.*** | AFTER DAYS |
| ADMIXTURE | | | | | | |
| $H_2SO_4$ | 96% | 90° C. | * | | | 14 |
| Glacial Acetic Acid | | 90° C. | * | | | 05 |
| Chromic Acid | 50% | 70° C. | * | | | 14 |
| $HNO_3$ | 70% | 25° C. | * | | | 02 |
| Methanol | | 25° C. | | | *** | 28 |
| Methylene Chloride | | 25° C. | | ** | | 14 |

TABLE-continued

| CHEMICAL DATA: | | | TEST DATA STATUS: | | | |
|---|---|---|---|---|---|---|
| CHEMICAL | % | TEMP. | DISS.* | ATTACK.** | UNAFF.*** | AFTER DAYS |
| Hydrofluoric Acid | 52% | 25° C. | * | | | 03 |
| = Weight gain - +9.5% | | | | | | |
| | | | PREPOLYMER | | | |
| $H_2SO_4$ | 96% | 90° C. | | | *** | 180 |
| Glacial Acetic Acid | | 90° C. | | | *** | 180 |
| Chromic Acid | 50% | 70° C. | | | *** | 180 |
| $HNO_3$ | 70% | 25° C. | | | *** | 60 |
| Methanol | | 25° C. | | | *** | 180 |
| Methylene Chloride | | 25° C. | | | *** | 180 |
| Hydrofluoric Acid | 52% | 25° C. | | | *** | 60 |

*DISSOLVED/DISINTEGRATED INTO TEST SOLUTION
**ATTACKED BY TEST SOLUTION
***NO LOSS OF INTEGRITY, NO WEIGHT LOSS/GAIN, NO CHEMICAL ATTACK
ADDITIONAL FACTS

While not willing to be bound by an specific theory or theories which might explain the unexpected improvement achieved using the techniques and materials of the present invention, the following discussion relates to some possible explanations.

By incorporating inorganic oxides in a medium such as, diglycidyl ether of resorcinol, there are far more reactive groups in the polymer (DGER) than are available in the inorganic constituent. Once reaction is initiated, all the available reactive groups on the oxides are reacted, but by minimizing the amount of the catalyst, full polymerization of the prepolymer is prevented. The catalyst only initiates the reaction between the hydroxyl or reactive sites of the inorganic oxide, and a portion of the oxirane groups, leaving other oxirane groups available for further polymerization. This gives a chemically bonded inorganic backbone or moiety to the polymer.

Another advantage of the present invention would appear to be with regard to water. Ordinarily, moisture is present on fillers, and is either physisorbed or chemisorbed, physisorbed meaning capable of being boiled off; chemisorbed meaning in some way chemically bonded and therefore not easily debonded or boiled off.

By heating the organic/inorganic mixture, to initiate the reaction between the hydroxyl and oxirane groups, excess physisorbed water is driven off after completion of the reaction. This excess water normally remains in conventional epoxy-filler mixtures, and can be very detrimental particularly to coatings and composite structures since it causes bubbles, cavities, and the like during or after final polymerization. Since all the hydroxyl groups are now chemically bonded, there are essentially no groups available to be hydrolyzed and cause problems at final polymerization.

It would further appear that reactivity is satisfied by minimum catalyst reacting all available hydroxyl groups, with a limited amount of oxirane groups. The resultant steric hindrance prevents any further polymerization of the prepolymer, until additional catalyst or hardener is added to effect three dimensional cross linking and full polymerization.

The following equation sets forth, by way of illustration and not by way of limitation, the sequence of the principal reactions which are thought to be involved.

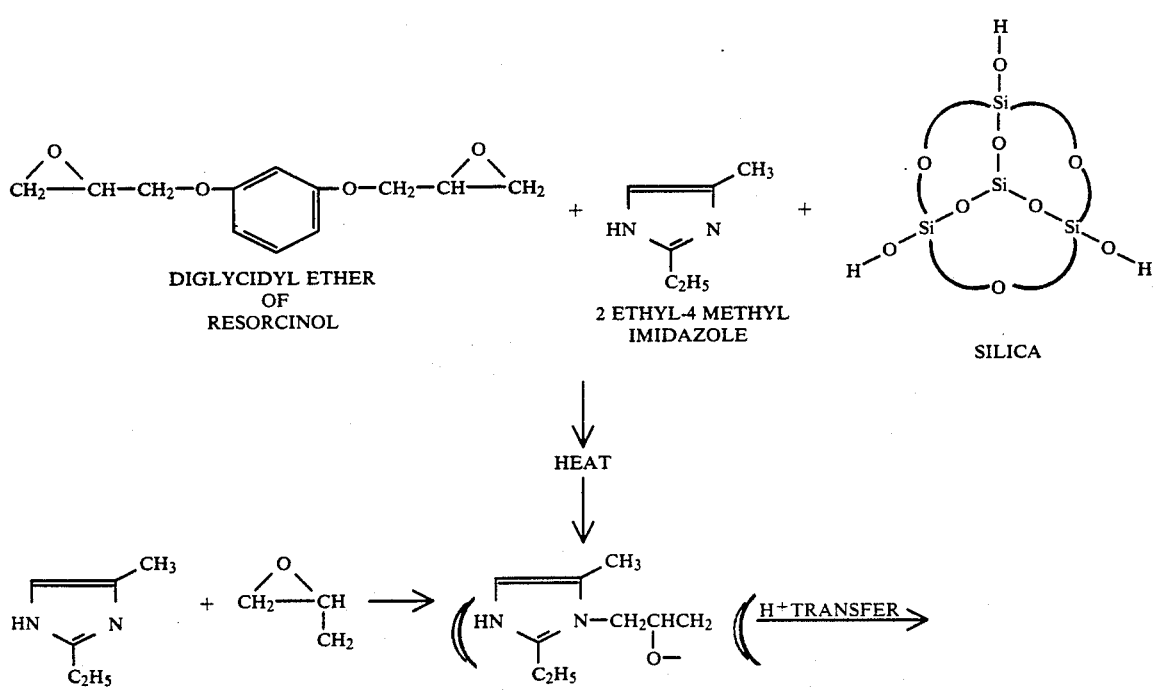

-continued

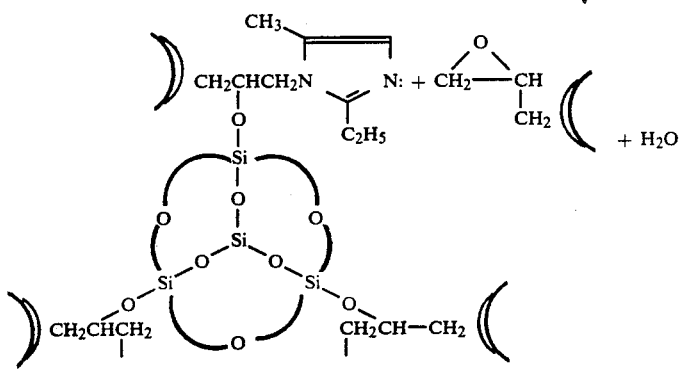

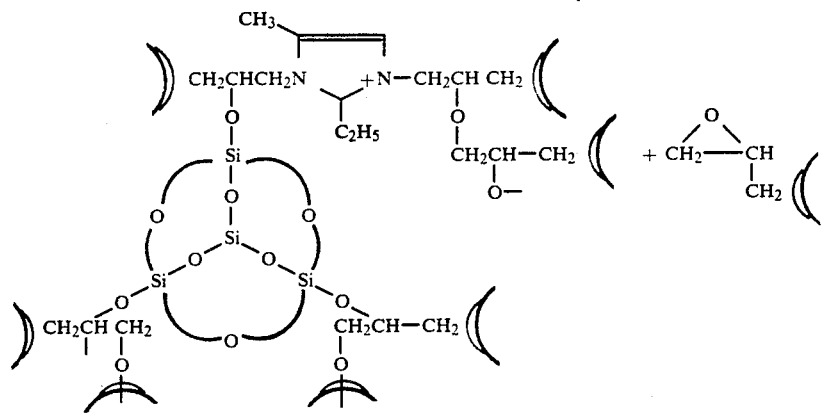

FOR FUTURE POLYMERIZATION

In general, the preferred oxirane oligomers of the present invention are dimers, trimers or tetramers, composed of or at least one aromatic moiety and at least one aliphatic moiety having an oxirane group, and having an expoxide equivalent in the range of from about 120 to about 200. Suitable oligomers on the other hand may have an epoxide equivalent in the range of from about 100 to about 3000.

As examples of suitable catalysts, the following specific materials are suggested by way of illustration and not by way of limitation.
imidazole
4-acetaminoimidazole
5-acetaminoimidazole
1-acetylimidazole
4-aminoimidazole
5-aminoimidazole
2-(2-aminoethyl)-imidazole
5-amino-1-methylimidazole
1-benzoylimidazole
2-benzylthioimidazole
4,5-bis(p-bromophenyl)-imidazole
2-chloroimidazole
4-benzylthio-5-nitroimidazole
5-benzylthio-4-nitroimidazole
4-bromoimidazole
5-bromoimidazole
2-bromo-4,5-diphenyl-imidazole
2-butylthio-2-cyclohexyl-4,5-diethylimidazole
1,5-dimethylimidazole
1-methylimidazole
2-methylimidazole
2-ethyl-4-methylimidazole
4-methylimidazole
1-methyl-4-phenylimidazole
1-methyl-4-nitroimidazole
5-nitroimidazole
1-phenylimidazole
2-phenylimidazole
1-methylimidazole
imidazole-4-acetic acid
1-vinyl-2-methylimidazole
imidazole-1-acetic acid
imidazole-1-aniline
5-butyramidoimidazole
4-carboxamidoimidazole
1-carbboxyimidazole
2-carboxyl-1-benzylimidazole
4,5-dicarboxamidoimidazole
4,5-dicarboxyimidazole
imidazole-1-ethanol
2-thioimidazole
2-acetamino-1-benzylbenzimidazole
1-acetylbenzimidazole
2-aminiobenzimidazole
2-(1-aminobutyl)4-amino-6-ethoxybenzimidazole 2-amino-1-ethylbenzimidazole
2-amino-1-methylbenzimidazole
1-benzylbenzimidazole
2-benzylaminobenzimidazole
1-benzyl-2-chlorobenzimidazole
2-benzyl-5-nitrobenzimidazole
2-p-bromobenzylbenzimidazole
2-butylthiobenzimidazole
5-chlorobenzimidazole
6-chlorobenzimidazole
6-chloro-I,2-dimethylbenzimidazole
5,6-dichlorobenzimidazole
5,6-dimeththylbenzimidazole
5,6-dinitrobenzimidazole
2-ethyl-5-nitrobenzimidazole
1-methylbenzimidazole
6-methyl-2-phenylbenzimidazole
6-phenylbenzimidazole
2-acetamino-N-methylbenzimidazole
benzimidazole-2-acetic acid
2-carboxamidobenzimidazole
2-carboxy-benzimidazole
2-carboyl-5-bromobenzimidazole
2,4-dimethylimidazoline
2-methylimidazoline
1-vinyl-2-methylimidazoline
2-ethyl-4-methylimidazoline
2-chloromethyl-2-imidazoline
2-methylimidazoline phenate
imidazole lactate
imidazoleacetate
3,4-dihydro-4-phenylpyrimidine
4-methyl-1,4,5,6-tetrahydropyrimidine
3,4-dihydroquinazoline
2-benzyl-2-imidazoline-4-carboxylic acid
2-(1-naphthylmethyl)-2-imidazoline and
2-chloromethyl-2-imidazoline The preferred catalysts are those of the imidazole and imidazoline series, and especially imidazole, 1-methlyimidazole, 2-methlyimidazole, 2-ethyl-4-methylimidazole, 2,4-dimethylimidazole, 2-phenylimidazole, 1-vinyl-2-methylimidazole, 2-ethyl-4-methylimidazoline and imidazole lactate. As examples of suitable inorganic oxides, the following specific material are suggested, again, by way of illustration and not by way of limitation. A list of representative oxides are as follows:
Silicon Oxide (Silica)
Aluminum Oxide
Titanium Oxide
Magnesium Oxide
Antimony Oxide
Zinc Oxide
Ferric Oxide
Molybdenum Oxide

PREFERRED EMBODIMENT

In the preferred aspect of this invention, the catalysts employed are imidazoles, benzimidazoles, dihydropyromidines, tetra hydropyrimidines, dihydroquinazolines and imidazolines which contain from 0-2 substitutents and especially from 0-1 substitutents. The preferred substitutents being lower alkyl, lower alkyl aryl, lower alkenyl, lower alkoxy and especially methyl, ethyl, phenyl and vinyl.

The partial polymerization is carried out using one of the preferred catalyst in an amount less than about one (1) part of catalyst per one hundred (100) parts of the oxirane oligomer. The inorganic oxide can range from thirty (30) parts per one hundred (100) parts of oligomer to four hundred (400) parts per one hundred (100) parts of oligomer depending on the physical properties desired, such as viscosity, heat distortion temperature, flow, and the like. The catalyst is most preferably used in an amount of between 0.01 and 0.50 parts per hundred (100) parts of oligomer. This is a small amount of catalyst compared to the 2 to 10 parts of catalyst per hundred (100) parts of oligomer normally used for complete polymerization.

In preferred prepolymers silica (fused silicon oxide), aluminum oxide, magnesium oxide or titanium dioxide, are the inorganic oxides, and are used in the following preferred ranges per hundred (100) parts of oligomer:

| | |
|---|---|
| Silica | 30 to 200 parts. |
| Aluminum Oxide | 40 to 400 parts. |
| Magnesium Oxide | 30 to 200 parts. |
| Titanium Dioxide | 30 to 100 parts. |
| Particle Size | 10 micron or less |
| | Average 4 micron or less |

Reaction and partial polymerization with bonding of the reactive sites of the inorganic oxide to a portion of the oxirane group, is accomplished by heating the oligomer in a reactor containing a high sheer mixer, until the oligomer reaches a predetermined temperature, generally between 60° C. and 90° C. The catalyst is added and mixed into the oligomer for a predetermined period of time, generally between about 5 to about 10 minutes. The inorganic oxide is added and sheered into the oligomer causing all surface areas of the oxide particle to be coated with the partially catalyzed oligomer. This mixing takes place for a predetermined period of time, generally between about one half ($\frac{1}{2}$) hour to about two (2) hours, at a temperature in the range from about 100° C. and 135° C. Heating of the reaction solution, at this temperature, causes all the excess water to be evaporated from the inorganic oxide prior to cross-linking of the reactive sites of the inorganic oxide with a portion of the oxiran groups.

The temperature of the reaction solution is subsequently increased to a predetermined temperature, generally from about 140° C. to about 220° C., for a predetermined period of time, generally from about one (1) hour to about four (4) hours. This heating of the reaction solution is believed to cause the hydroxyl groups of the inorganic oxide to react with a portion of the oxirane groups, giving a partially polymerized prepolymer. The reaction ceases when all the available sites have reacted and heating is then discontinued.

Increasing the catalyst, temperature or time above the preferred levels, may cause the polymer to polymerize to an unusable degree or state.

The invention will be better understood by reference to the following examples, which are presented for purpose of illustration only and are not intended to be construed in a limiting sense.

EXAMPLE 1

2724 grams of liquid resin, diglycidyl ether of resorcinol, and 4.09 grams of catalyst, 2-ethyl-4-methylimidazole were charged to a reactor equipped with an exhaust system and a high shear mixer. The reactants were mixed while raising the temperature to 80° C. Upon reaching 80° C., 3405 grams of silica, having an average particle size of 4 microns were added to the reactor. The reactants were heated to 150° C., while mixing at 3000 RPM for a period of three (3) hours. When the solution changed color, the reactor was removed from the heat, but mixing was continued for one (1) hour, after which the product was discharged from the reactor and recovered.

| Results | |
|---|---|
| Color | Dark Tan Opaque |
| Viscosity @ 77° C. (Broodfield RV7, 20 RPM) | 3500 CPS |
| Non-Volatile Content | 99.99% |
| Specific Gravity | 1.29–1.32 |
| Epoxy Equivalent Weight, G | 165–180 |
| % Sedimentation | <0.1 |

EXAMPLE 2

2724 grams of liquid resin, the diglycidyl ether of resorcinol, and 17.70 grams of catalyst, 2-ethyl-4-methylimidazole were charged to a reactor equipped with an exhaust system and a high shear mixer. The reactants were mixed while raising the temperature to 80° C. Upon reaching 80° C., 3405 grams of silica, having an average particle size of 4 microns were added to the reactor. The reactants were then heated to 150° C., while mixing at 3000 RPM. The solution changed color after about thirty (30) minutes, and exotherm continued to increase solution temperature to 235°·C., at which time the mixer was removed, and the solution was removed from reactor and cooled externally.

Results

Exothermic reaction caused the solution to continue to polymerize, until it was an irreversible solid.

EXAMPLE 3

2724 grams of liquid resin, the diglycidyl ether of resorcinol, and 2.45 grams of catalyst, 2-ethyl-4-methylimidazole were charged to a reactor equipped with an exhaust system and a high shear mixer. The reactants were mixed while raising the temperature to 80° C. Upon reaching 80° C., 3405 grams of silica, having an average particle size of 4 microns were added to the reactor. The temperature of reactants was then increased to 150° C., for three (3) hours after which the solution still had very little color change. The temperature was then increased to 205° C. for one (1) hour with no measurable change in color. The temperature was increased to 250° C. still with no apparent change in color. Heating was then discontinued, and the solution was allowed to cool down.

Results

After the solution had cooled, observation showed liquid-solid separation. Over 60% of the Silica had sedimentated to the bottom.

EXAMPLE 4

2724 Grams of liquid resin, diglycidyl ether of bisphenol A (DGERA), and 4.09 grams of catalyst, 2-ethyl-4 methylimidazole were charged to a reactor equipped with an exhaust system and high shear mixer. The reaction was then carried out in the manner set forth in Example 1 above.

| Results | |
|---|---|
| Color | Dark Tan Opaque |
| Viscosity | 18,000 CPS (Brookfield RV7, 20 RPM) |
| Non-Volatile Content | 99.99% |
| Epoxy Equivalent Weight | 201–213 |
| % Sedimentation | 0 |

EXAMPLE 5

(Tri-Functional Epoxy)

In a manner similar to that set forth in Example 1 above, 2724 grams of tris-(hydroxyphenyl) methane triglycidyl ether and 5.40 grams of catalyst, 2-ethyl-4-metylimidazol were charged to a reactor equipped with an exhaust system and high shear mixer. The reactants wee mixed at a temperature of 80° C. and 3405 grams of silica, having an average particle size of 4 microns were added to the reactors. The reactants were heated to 150° C., while mixing at 3500 RPM for a period four (4) hrs. The product was discharged from the reactor and recovered.

| Results | |
|---|---|
| Color | Cream Opaque |
| Viscosity at 150° F. | 9000 (Brookfield RV7, 20 RPM) |
| Non Volatile Content | 99.99% |
| Specific Gravity | 1.3–1.32 |
| Epoxy Equivalent Weight | 180–198 |
| % Sedimentation | 0 |

From the foregoing examples it will be clear that an excess of catalyst (Example 2) provides a fully polymerized mass, while a deficiency of catalyst (Example 3) yields a product in which much of the inorganic oxide is merely admixed with the other reactants and separates out prior to the final polymerization. The fully polymerized product of Example 2 had substantially inferior physical properties, in comparison to the product of Example 1, as described in the earlier Table.

The patents, and any patent publications set forth in this specification are intended to be incorporated by reference herein.

It is apparent that there has been provided in accordance with this invention novel polymers and prepolymers, as well as a process for producing such polymers and prepolymers. While the invention has been described in combination with the specific materials and embodiments thereof, it is evident that many substitutions, alternatives, modifications, and variations will be apparent to those skilled in the art in light of the foregoing description. Accordingly, it is intended to embrace all such substitutions, alternatives, modifications and variations as fall within the spirit and scope of the appended claims.

I claim:

1. An oxirane prepolymer comprising the reaction product of an inorganic oxide having at least one hydrolyzable oxygen with a difunctional oxirane oligomer having at last one aromatic moiety and at least one oxirane containing aliphatic moiety, characterized in that said reaction is conducted in the presence of from about 0.01 to about 1.5 parts by weight of an imidazole catalyst per 100 parts by weight of oligomer, and substantially all of the hydrolyzable oxygen atoms in said oxide are bonded to said oligomer and there is substantially no bonding between oligomer moieties.

2. The prepolymer according to claim 1 wherein said oligomer is the diglycidyl ether of resorcinol.

3. The prepolymer of claim 1 wherein said oligomer is the diglycidyl ether of bisphenol A.

4. The prepolymer of claim 2 wherein said metallic oxide is silica.

5. The prepolymer of claim 3 wherein said metallic oxide is silica.

6. The prepolymer of claim 4 wherein said silica is present in the range of from about 20 to about 200 parts by weight per 100 parts by weight of oligomer.

7. The prepolymer of claim 5 wherein said silica is present in the range of from about 20 to about 200 parts by weight per 100 parts by weight of oligomer.

8. The prepolymer of claim 2 wherein said metallic oxide is aluminum oxide.

9. The prepolymer of claim 3 wherein said metallic oxide is aluminum oxide.

10. The prepolymer of claim 2 wherein said metallic oxide is magnesium oxide.

11. The prepolymer of claim 3 wherein said metallic oxide is magnesium oxide.

12. The prepolymer of claim 2 wherein said metallic oxide is a member selected from the group consisting of titanium oxide, antimony oxide, zinc oxide, iron oxide and molybdenum oxide.

13. The prepolymer of claim 3 wherein said metallic oxide is a member selected from the group consisting of titanium oxide, antimony oxide, zinc oxide, iron oxide and molybdenum oxide.

* * * * *